(No Model.) W. WEAVER. 10 Sheets—Sheet 4.
LOOM.
No. 576,175. Patented Feb. 2, 1897.
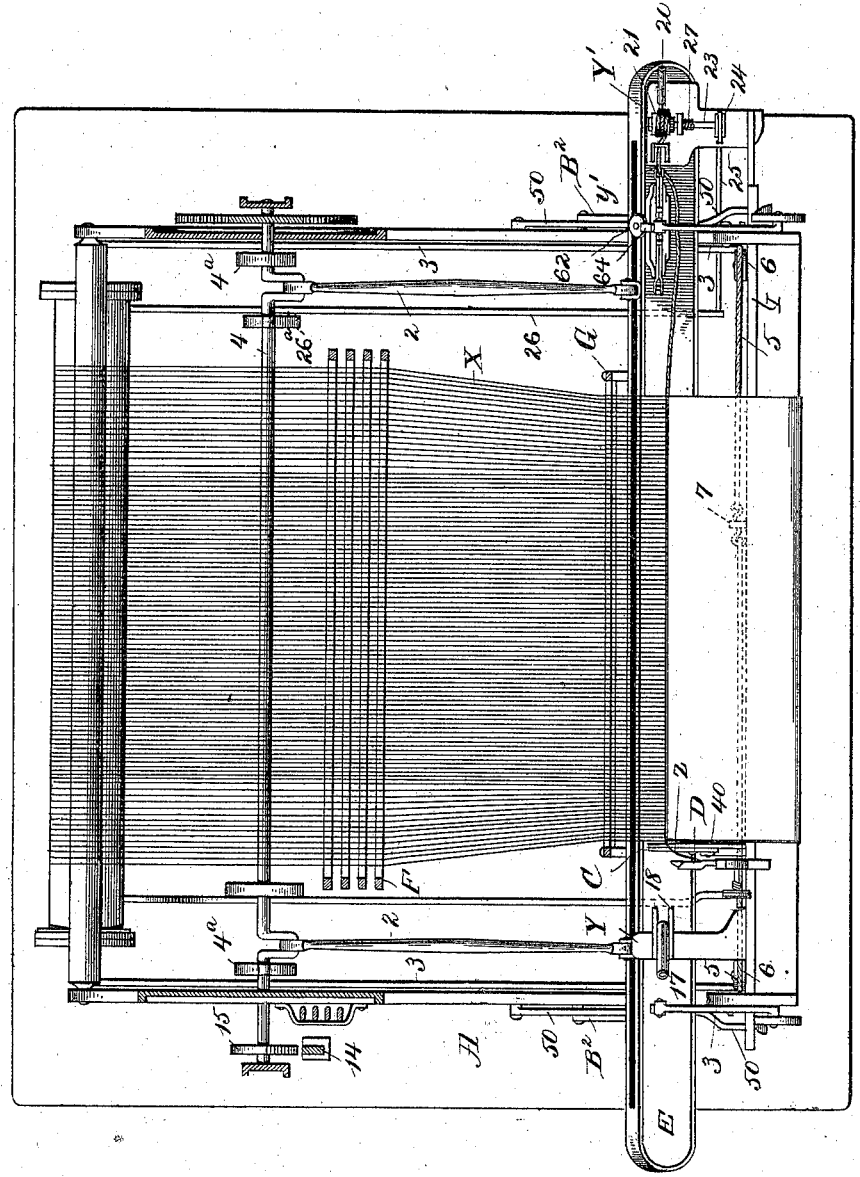

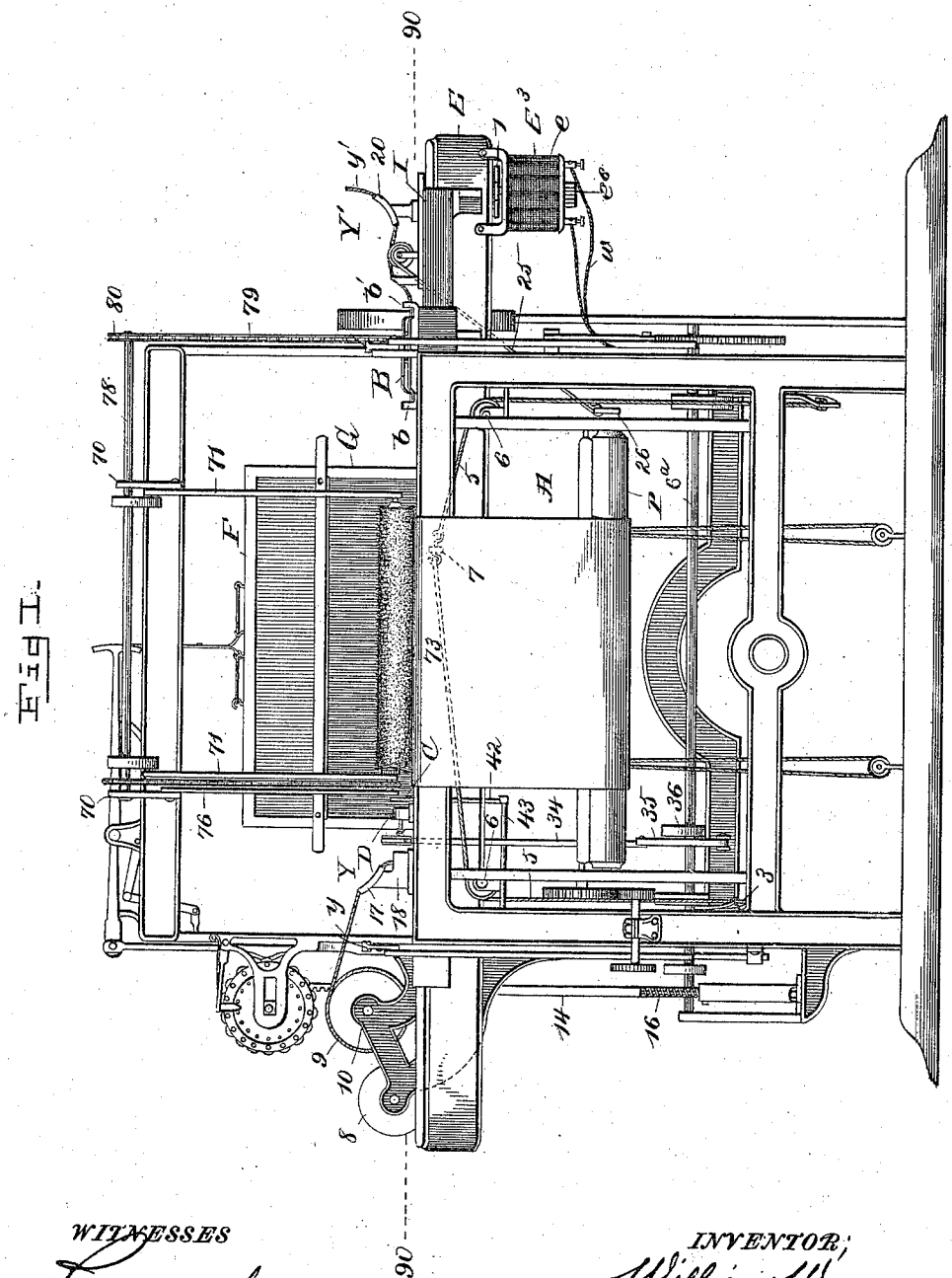

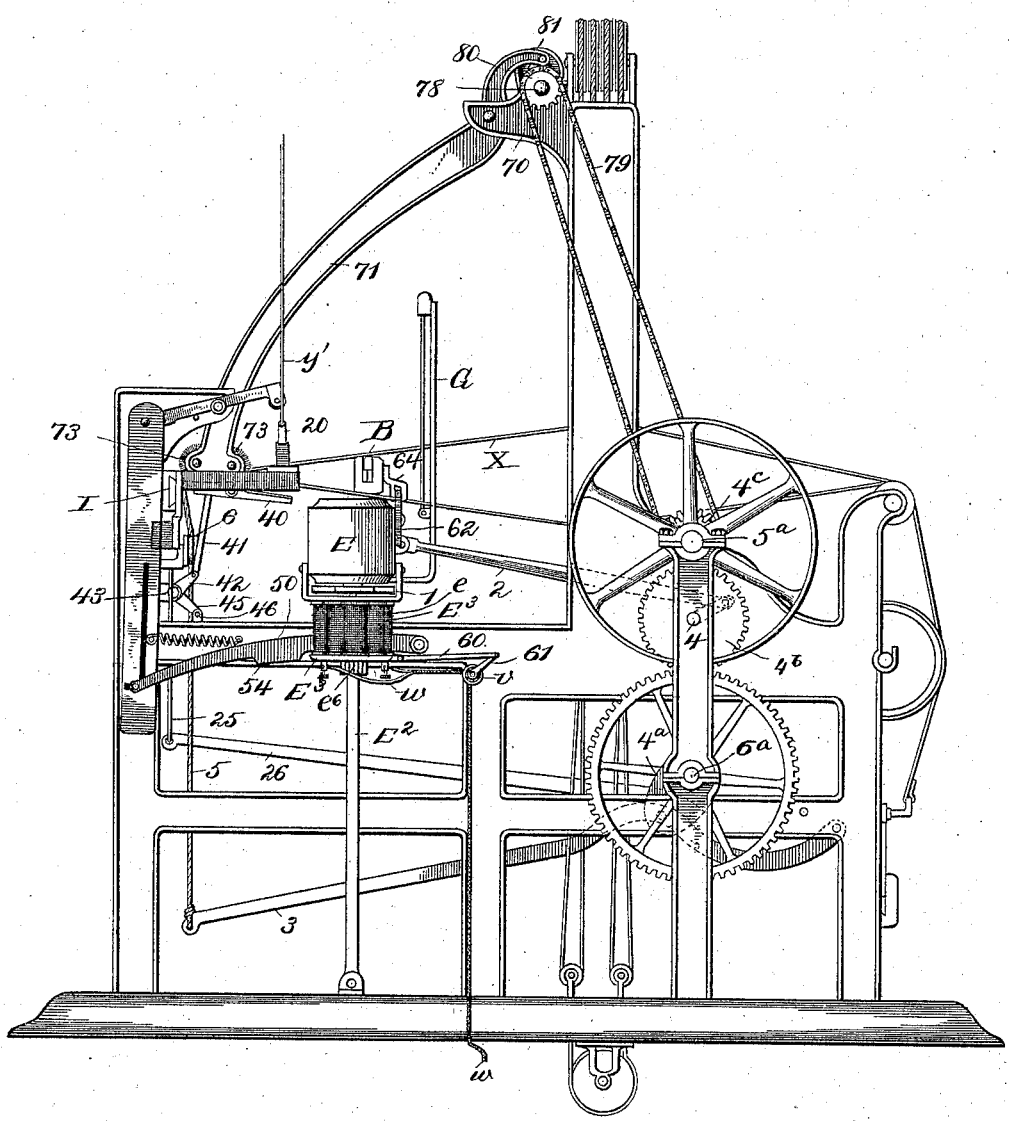

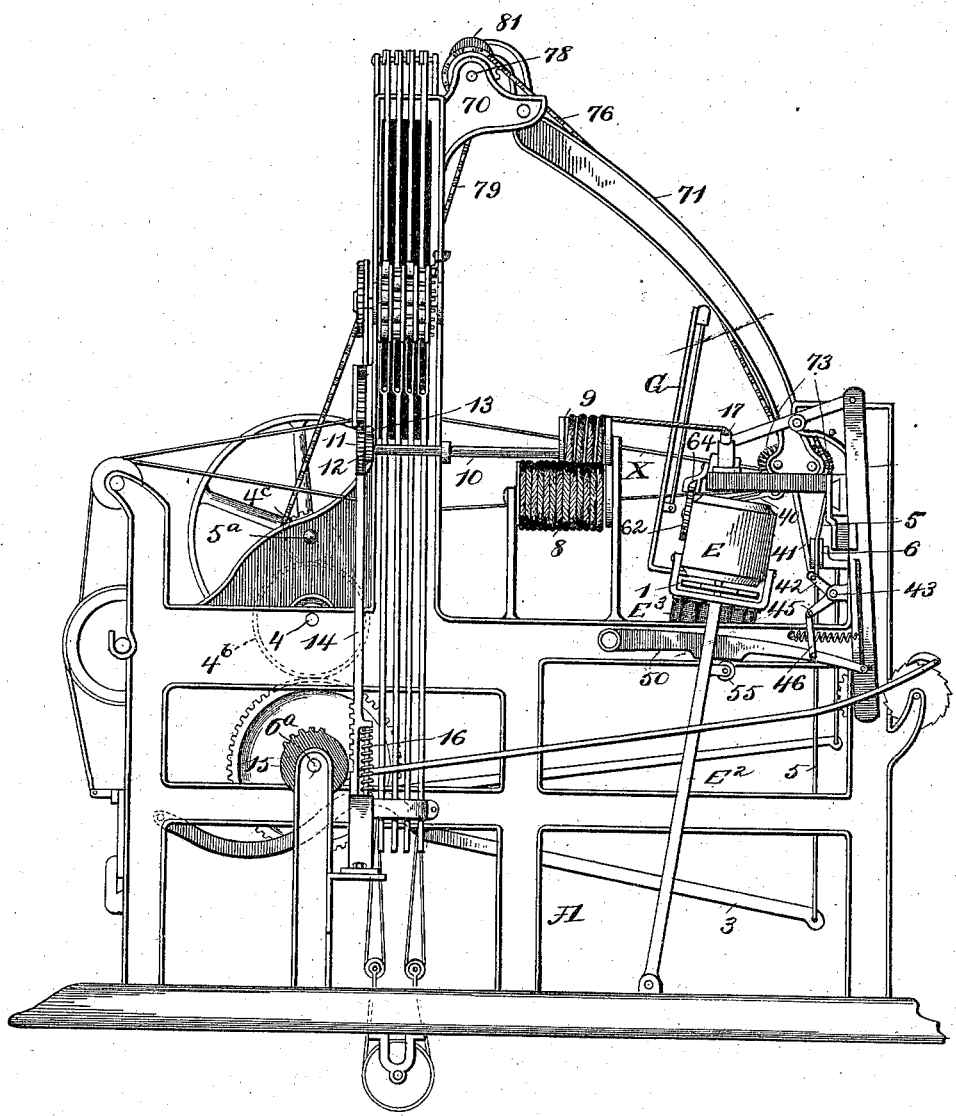

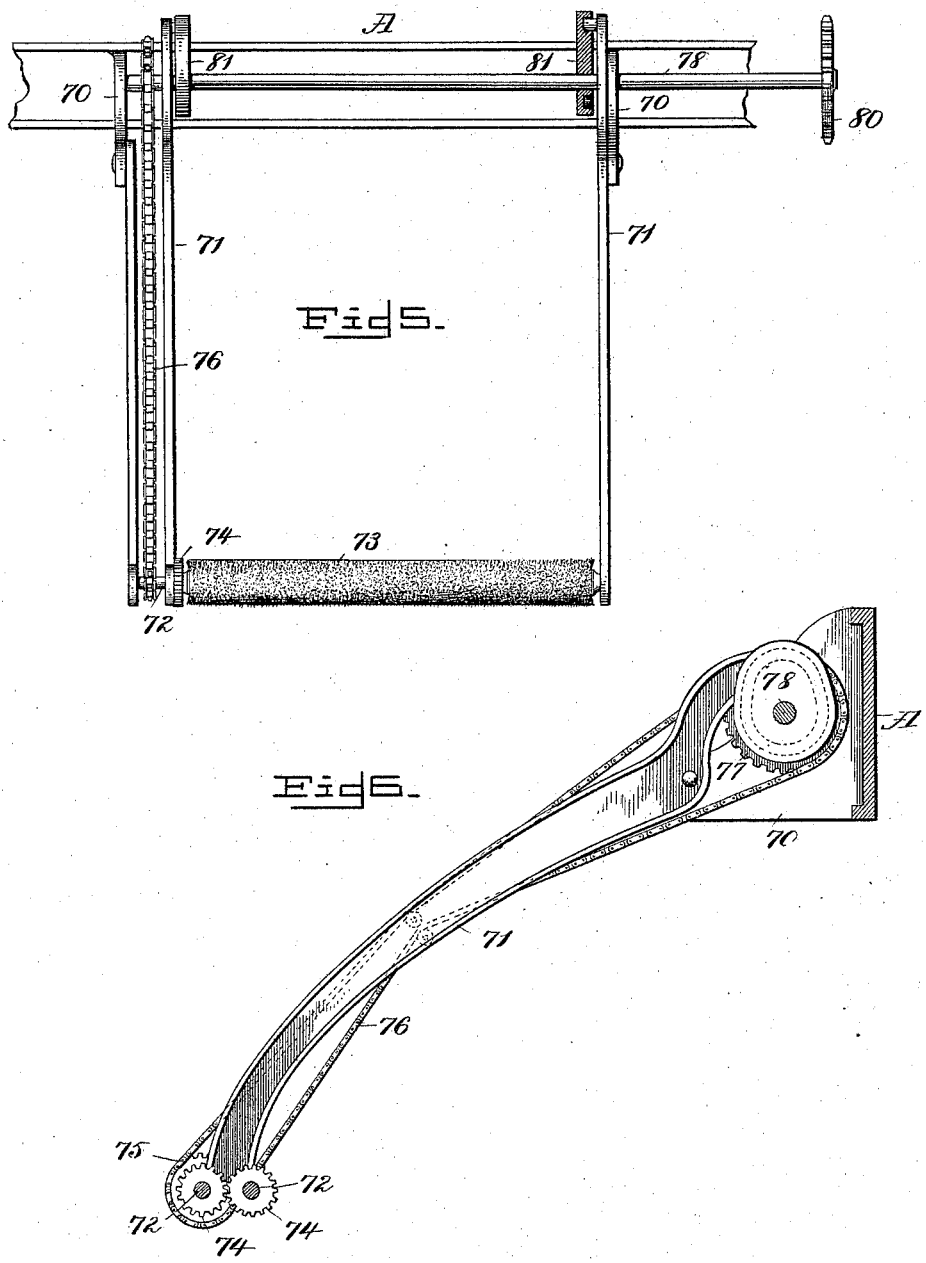

(No Model.) 10 Sheets—Sheet 6.
W. WEAVER.
LOOM.
No. 576,175. Patented Feb. 2, 1897.
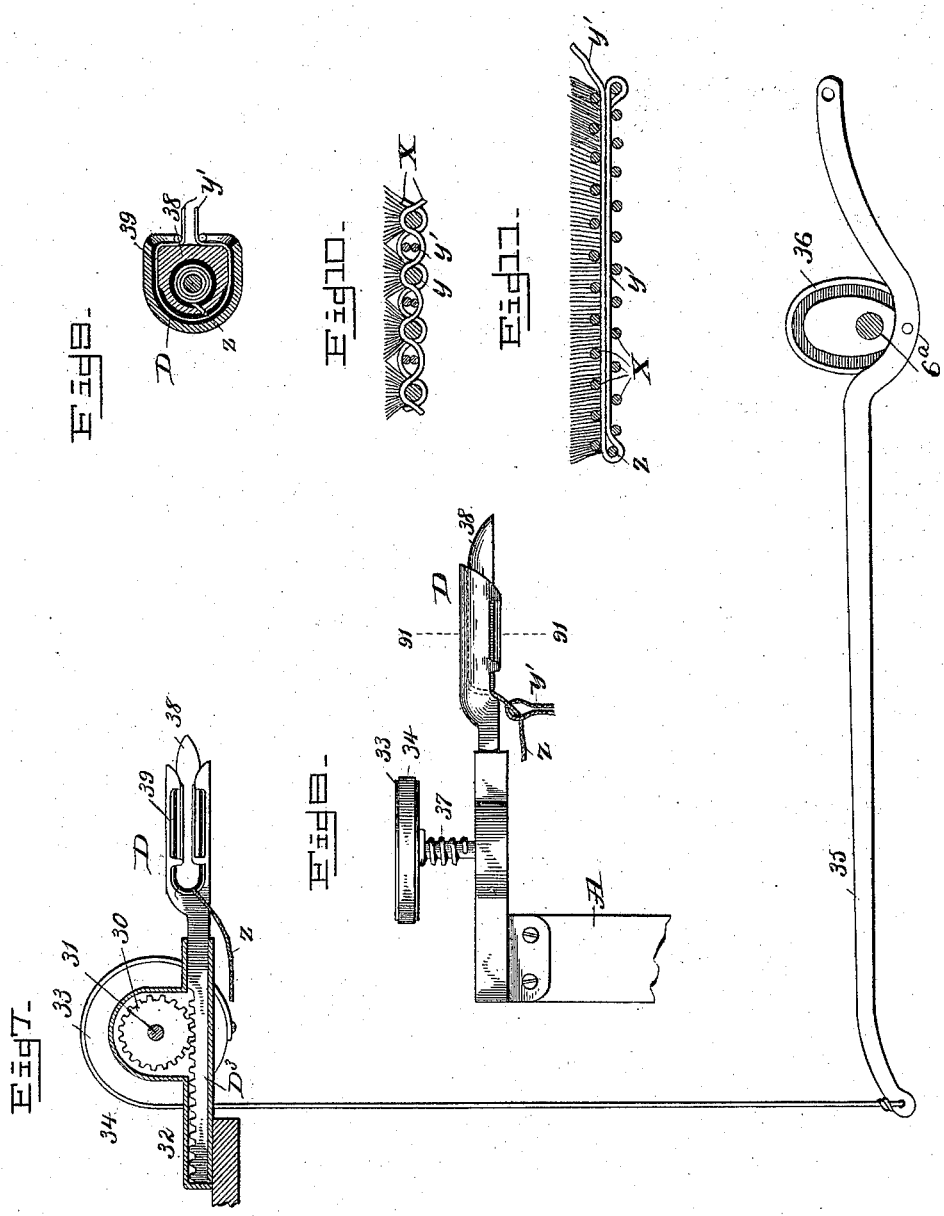

(No Model.)
10 Sheets—Sheet 7.
W. WEAVER.
LOOM.
No. 576,175.  Patented Feb. 2, 1897.
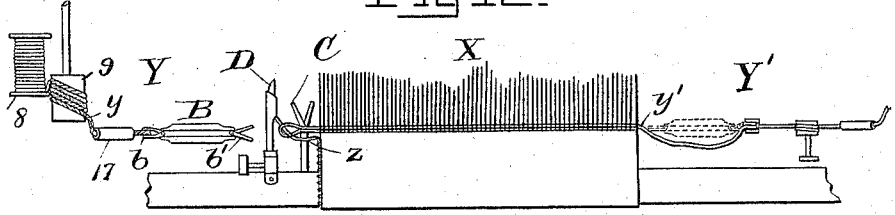
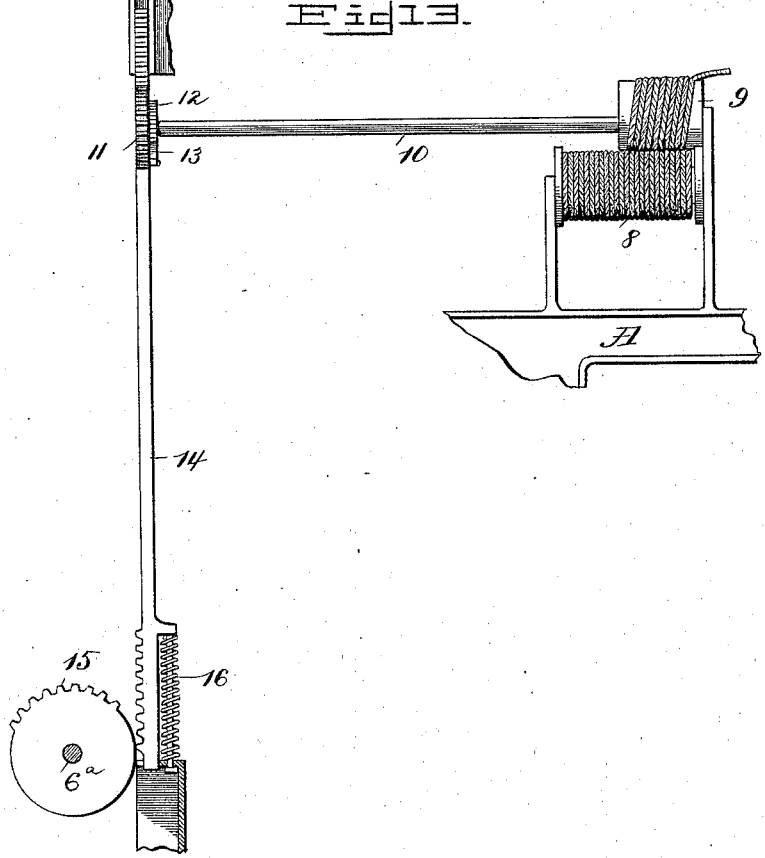

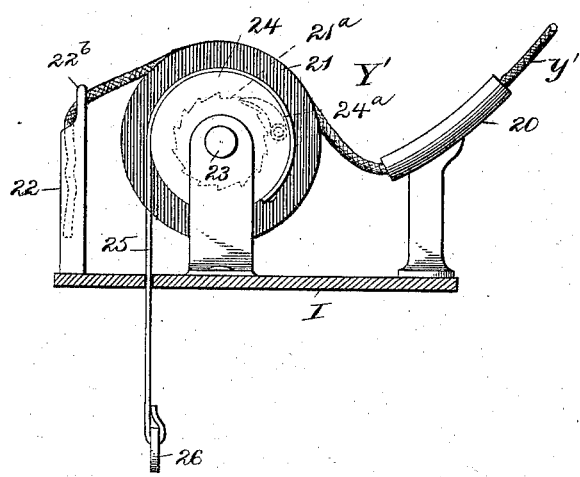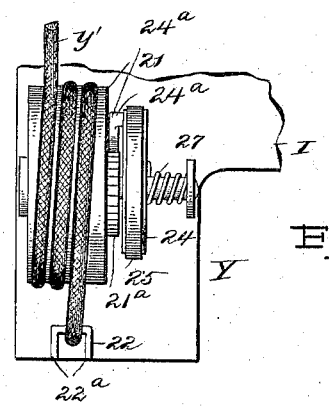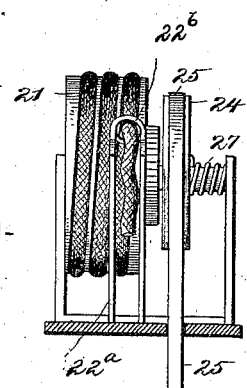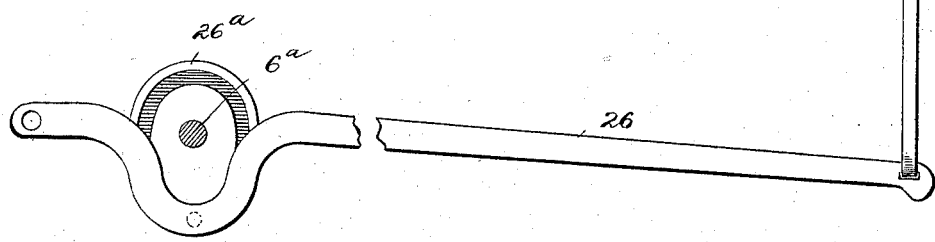

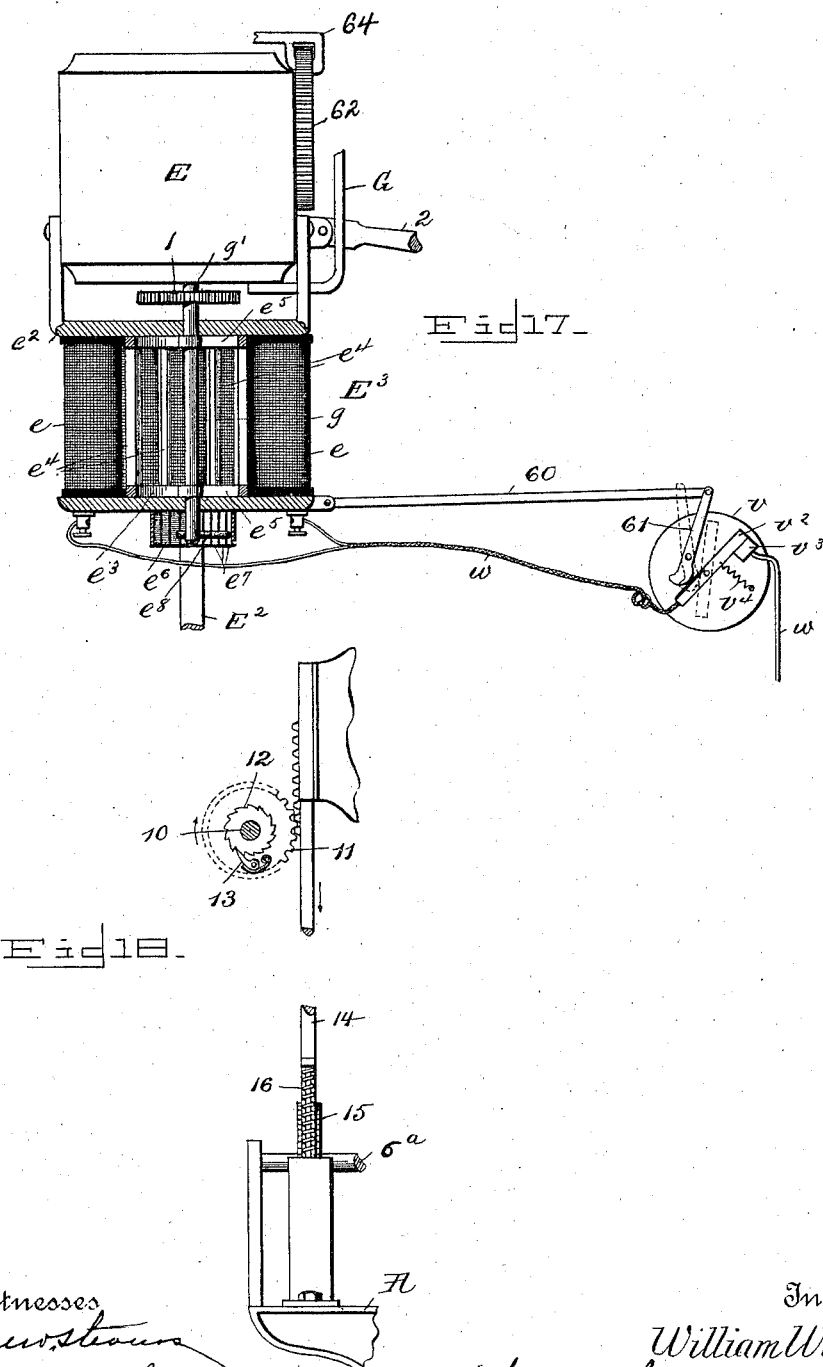

(No Model.) 10 Sheets—Sheet 10.
W. WEAVER.
LOOM.
No. 576,175. Patented Feb. 2, 1897.
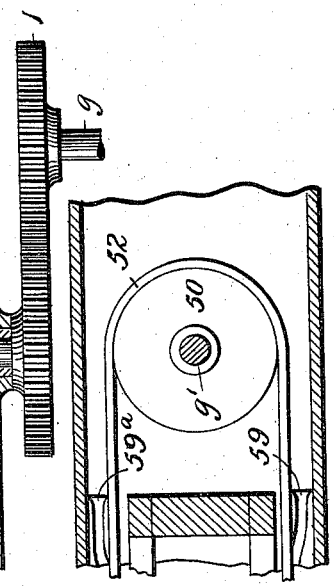
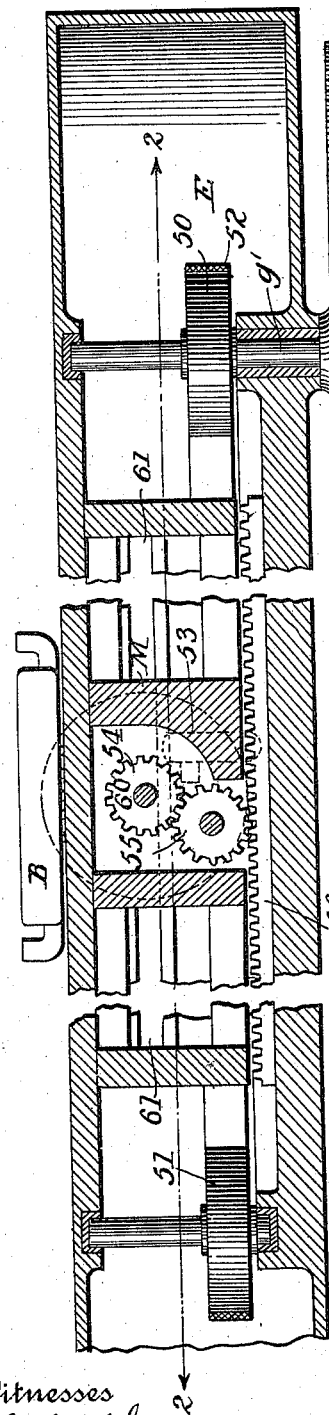
Fig. 19.
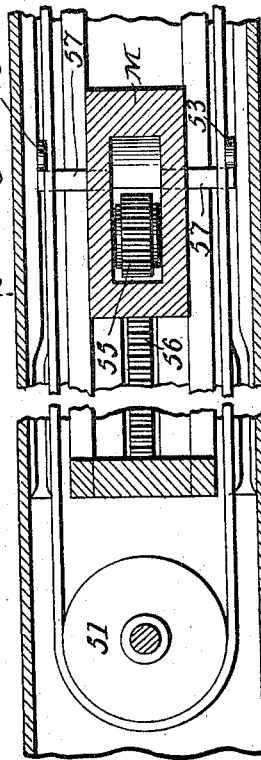
Fig. 20.
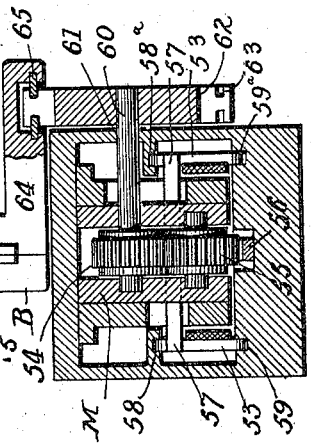
Fig. 21.
Witnesses
J. G. Finkel
James O. Stevens
Inventor
William Weaver
by Foster Freeman & Co.
Attorneys

UNITED STATES PATENT OFFICE.

WILLIAM WEAVER, OF NORWALK, CONNECTICUT.

LOOM.

SPECIFICATION forming part of Letters Patent No. 576,175, dated February 2, 1897.

Application filed November 25, 1893. Serial No. 491,978. (No model.)

*To all whom it may concern:*

Be it known that I, WILLIAM WEAVER, a citizen of the United States, residing at Norwalk, in the county of Fairfield and State of Connecticut, have invented certain new and useful Improvements in Looms; and I do hereby declare the following to be a full, clear, and exact description of the invention, such as will enable others skilled in the art to which it appertains to make and use the same.

My invention relates to looms, and more especially to that class of looms adapted to weave what is known as "chenille" or "fur" filling-strips into a chenille fabric; and it consists in means whereby threads are fed to the thread-gripper and carried across the warp.

It consists, further, in means whereby the filling strips or threads are sheared at one edge of the fabric.

It further consists in mechanism for automatically securing the loops of the binding weft-threads at the edges of the fabric; and, further, it consists in means for driving the thread-carrier independent of that which drives the other devices of the machine; and it finally consists in the various novel details of construction hereinafter set forth.

In the accompanying drawings, forming a part of this specification, and in which like letters and numerals of reference indicate corresponding parts, Figure 1 is a front elevation of the invention as an entirety. Fig. 2 is a side elevation of the invention. Fig. 3 is an elevation of the opposite side of the machine. Fig. 4 is a sectional plan view thereof, taken on the line 90 90 of Fig. 1. Fig. 5 is a detail front elevation of the mechanism for brushing up the pile of the chenille fabric. Fig. 6 is a side elevation of the same. Fig. 7 is a detail side elevation of the shuttle and its operating mechanism for securing the binding weft-threads to the edge of the warp. Fig. 8 is a plan view thereof. Fig. 9 is a sectional view of the same on the line 91 91 of Fig. 8. Fig. 10 is a longitudinal sectional view of a portion of the chenille fabric produced upon the loom. Fig. 11 is a transverse sectional view of the same. Fig. 12 is a diagrammatic view of the method of manufacturing fabric. Fig. 13 is a detail side elevation of the mechanism for automatically paying off the chenille filling or strips or threads. Fig. 14 is a detail side elevation of the mechanism for taking up the slack in the binding-threads. Fig. 15 is a plan view of the same, and Fig. 16 is a front elevation thereof. Fig. 17 is a detail end elevation, parts being broken away and in section, of the lathe, motor, and motor-control switch. Fig. 18 is a detail view, parts being broken away, of the mechanism for automatically paying off the filling strips or threads. Fig. 19 is a vertical longitudinal sectional view of the operating mechanism of the thread-carrier. Fig. 20 is a horizontal longitudinal sectional view thereof on the line 2 2 of Fig. 19; and Fig. 21 is a transverse sectional view on the line 5 5, Fig. 20.

The operation of my invention is best shown in Fig. 12, in which X represents the warp-threads of the loom, the same interlocking with the weft-threads, forming a fabric. Y represents the mechanism located at one side of the warp-threads, for feeding the chenille or fur filling-strips to the thread-carrier B, and for paying it off as the carrier travels across the warp, and at the same rate of speed. Y' represents the take-up mechanism arranged at the opposite side of the warp-threads from that on which the feeding mechanism is located for feeding the weft-threads to the carrier and for taking up all the slack of the weft-threads after they have been carried across the warps. Between the thread-feeders Y Y' and across the warp a thread-carrier B is designed to travel. This thread-carrier is provided at opposite ends with gripper-jaws *b b'*. Arranged between the edge of the warp and the thread-feeder Y are shears or thread-cutters C and a loop-taker or selvage-shuttle D.

We will now suppose that the thread-carrier B is in the position shown in full lines in Fig. 12. The gripper *b* of the thread-carrier B seizes the end of the chenille filling *y*, and as the thread-carrier travels toward the opposite side it carries said filling between the warp-threads, the filling-thread being paid off by its feeding mechanism during the movement of the thread-carrier. When the thread-carrier reaches the position shown in dotted lines, the shears or thread-cutters C sever the filling close up to the edge of the warps, while the gripper-jaws *b* simultaneously release at the opposite side the ends which it has just drawn across the warps. The opposite gripper-jaws $b'$ of the thread-carrier then seize the weft-thread $y'$ and draw it in form of a loop, or doubled, through the warp to the opposite side, when the loop is interlocked with the shuttle-thread $z$ by means of the reciprocating selvage-shuttle D, after which the loop is automatically drawn up to the edge of the fabric by take-up mechanism Y' at the opposite side of the warp. The weft-thread $y'$ is secured at the edge of the warp opposite to the selvage-shuttle by being folded over the edge warp-threads.

Having thus described the essential features of the operation, I will now describe the construction and arrangement of the devices which in practice have proved to be effective, reference being had to the remaining figures of the drawings.

The frame A is constructed in a suitable manner to support the thread-feeders Y Y', the lathe E, the heddles F and their operating mechanism, the devices for brushing up the pile of the fabric, and the mechanism for imparting the regular movements of these and the other parts of the loom.

E is the lathe, which extends transversely across the forward part of the loom parallel with the breast-beam thereof. A thread-carrier B, provided at its opposite ends with gripper-jaws $b$ $b'$, is supported upon the lathe E and is designed to reciprocate across said lathe.

G is the reed, secured to the lathe E in any suitable manner and extending vertically therefrom. $E^2$ $E^2$ are the swords of the lathe, (see Figs. 2 and 3,) secured to the lathe at their upper ends and pivoted at their lower ends to the frame A.

Secured to the under side of the lathe E, at one end thereof, is an electric motor $E^3$, designed to supply the power for operating the thread-carrier B. This motor is similar in construction to those shown and described in Patents Nos. 385,675 and 394,075, and, as shown in Fig. 17, consists of a series of electromagnets $e$, arranged in a circle and connected to a frame $e^2$. Journaled in said frame and designed to rotate in a circular chamber formed by said electromagnets is the armature $e^3$, which consists of a series of steel bars $e^4$, equal in number to the electromagnets $e$ and connected together by end plates $e^5$. One end of the shaft $g$ of said armature extends into the commutator $e^6$, formed of a number of metal strips $e^7$, insulated from each other and circularly arranged, and carries in its end a carbon or other suitable brush $e^8$, which is designed to engage successively the strips $e^7$ of the commutator $e^6$ as the armature is revolved. The other end of the shaft $g$ extends vertically and carries a pinion $l$, which meshes with a similar pinion upon a shaft $g'$ to convey a rotary motion to a band wheel or pulley 50, mounted on the shaft $g'$ in one end of a chamber in the lathe E. Around this pulley and around a similar pulley 51, located on the opposite end of the chamber, is an endless band 52, provided with bearings 53.

M is a reciprocating block, in which is journaled a pinion 54, meshing with a similar pinion 55, likewise journaled in the block, this latter pinion in turn gearing with a rack 56, fixed to the bottom of the chamber of the lathe. Upon each side of the block M is a bearing 57, which extends across the path of movement of the bearings 53 and is adapted to be engaged thereby. From this it will be apparent that when the band 52 is caused to travel by its driving-pulley 50 the bearings 57 will make contact with the bearings 53 and the block A will be moved according to the direction in which the bearing 57 is traveling. As the block M moves the pinions 54 55 are rotated from the stationary rack.

In the top and bottom walls of the lathe-chamber are formed channels 58, $58^a$, 59, and $59^a$, which for the greater part of their lengths are parallel with the straight sides of the endless band, but at the ends these channels are curved outward. The ends of the bearings 53 extend into said channels and travel therein. It will thus be seen that when the block M is being moved from one end of the chamber to the other the bearings 53 57 are in contact, but as the block nears the end of the chamber the bearings 53 will be carried out of contact with bearings 57 by the channels, and consequently the block will remain stationary until the bearings 53 travel around one of the pulleys and engage a bearing 57 upon the opposite side, thereby causing the block to move in the opposite direction. Of course it will be understood that when the bearings 53 are carried outward the band also moves outward to accommodate the movement.

The shaft 60 of the pinion 54 extends through a slot 61 in the rear wall of the lathe and supports a bladed wheel 62 at its end. This wheel is of such diameter that its teeth extend above the plane of the top of the lathe, and upon opposite sides these teeth are provided with notches 63, all of which are arranged in the same circular plane.

The thread-carrier B is provided with a rearwardly-extending arm 64, having curved plates 65, which extend into the notches in the blades of the wheel 62, thereby supporting the thread-carrier above and out of contact with the lathe, but in the same vertical plane. The warp-threads are received in the spaces between the blades of the wheel 62 as it rotates and travels and pass under the thread-carrier.

A reciprocating motion is imparted to the lathe E through the connecting-rods 2, connected at opposite ends to the lathe and to cranks of the crank-shaft 4. This crank-shaft is connected by means of gears $4^b$ and $4^c$ to a power-shaft $5^a$, from which it is operated.

I is a slide extending across the forward part of the loom and supported in a dovetailed groove in the frame. This slide extends for some distance beyond the marginal warp-threads and carries on each end the thread-feeders Y Y', and its ends are designed to be moved toward the edges of the warp alternately to throw the thread-feeders Y Y' in close proximity thereto. After the thread-carrier has gripped the chenille filling-thread $y$ and traveled across the warp to the opposite terminal of its movement the lathe E is rocked forward, bringing the thread-carrier B into horizontal alinement with the weft-thread-feeding devices Y'.

The shears or thread-cutters C then sever the chenille filling-thread, which has been thrown between them by the forward movement of the lathe, close to the edge of the selvage, and as the chenille-filling feeder Y has been moved adjacent to the edge threads of the warp by the movement of the slide I no loss of material is sustained.

Simultaneously with the action of the thread-cutters C at the opposite end of the warp the gripper-jaws $b$ $b'$ of the thread-carrier are caused to be opened, releasing the chenille filling-thread which it has just brought across, the gripper-jaws $b'$ remaining open to receive the binding weft-thread from its feeding devices Y', which are caused to move toward it by the action of the slide I. After the binding weft-thread has been seized by the jaws $b'$ the lathe is returned to its rear position, as shown in Fig. 2, and the thread-carrier starts on its return movement across the warp, with the binding weft-thread in shape of a loop, or doubled, the slide I continuing its movement toward the edge of the warp, which it reaches about the same time as the thread-carrier does the opposite side. The reciprocating selvage-shuttle D then passes through the loop and carries the shuttle-thread $z$ through it. After this is accomplished the gripper-jaws $b'$ of the thread-carrier B release the binding weft-thread, and its loop is drawn close to the edge of the selvage by automatic take-up devices J, located at the opposite sides of the warp and which will presently be more fully described, and the gripper-jaws $b$ again seize the end of the chenille filling-thread preparatory to carrying it across the warp, and so on, the above operation being repeated during the weaving of a fabric.

The mechanism whereby the movement of the slide I is effected (see Figs. 1, 2, 3, and 4) consists of two levers 3, pivoted one on each side of the loom, and to which a vertically-reciprocating movement is imparted alternately by cams $4^a$, secured upon the cam-shaft $6^a$. To the ends of these levers cords 5, which pass over friction-pulleys 6, are connected. These cords are also connected to a lug 7, secured to the center of the slide I.

In order to reduce the strain upon the thread-carrier B consequent upon its carrying the heavy chenille filling-thread across the warp, I have provided suitable mechanism, which I will now describe, for paying off the thread at the same rate of speed as that at which the thread-carrier B travels across the warp.

Journaled loosely on the frame A of the loom is a drum 8, which carries the prepared chenille filling-thread Y. Arranged adjacent to the drum 8 is a similar drum 9, journaled upon a shaft 10, extending paralleled to the side of the loom-frame A to near the rear end thereof. Journaled loosely on the end of this shaft 10 is a gear 11. A ratchet-wheel 12, carried upon the shaft 10, is arranged adjacent to the gear 11 and is engaged by a pawl 13, carried upon said gear, said pawl being so arranged as to permit the rotation of the gear-wheel 11 in one direction independent of the shaft 10. A vertical rod 14, carrying teeth on its upper and lower ends, engages the gear-wheel 11 at its upper end. This shaft is in turn engaged at its lower end by a toothed segment 15 on the cam-shaft $6^a$, from which it is operated. From this it will be seen that when the toothed segment 15 engages the teeth on the lower end of the rod 14 the rod will be depressed against the action of the spring 16, which encircles a portion of the rod 14 and bears at opposite ends against a lug on said rod and the frame A, and the drum 9 be caused to revolve through the instrumentality of its shaft 10, the gear-wheel 11, and the ratchet and pawl 12 and 13, and the chenille filling-thread $y$ to be unwound from said drum. In order to insure the seizing of the filling-thread $y$ by the gripper-jaws $b$ of the thread-carrier, I make use of a tubular guide 17, secured on the end of the slide I. Adjacent to the sides of this guide are arranged two parallel flanges 18, sufficiently spaced apart to permit the open gripper-jaws $b$ to be thrust between them to seize the end of the filling-thread. As seen in Figs. 1, 3, and 13 of the drawings, this filling-thread is carried upon the drum 8, and thence it passes around the drum 9 and through the tubular guide 17.

When the doubled binding weft-thread $y'$ has been carried across the warps by the thread-carrier, its loop must of necessity project out from the edge threads of the warp to permit it to be engaged by the reciprocating selvage-shuttle D. After this shuttle has passed through the loop and is withdrawn, leaving the shuttle-thread $z$ through the loop, it is necessary that the loop be drawn close to the edge of the warp. Various means may be employed for effecting this, but I deem the mechanism which I will now describe, and which I call the "slack-weft take-up" mechanism, to be the most effective, reference being had particularly to Figs. 14, 15, and 16 of the drawings.

The binding weft-thread is fed through a tubular guide 20, secured upon one end of the slide I, and thence over the take-up wheel 21, and from thence it passes through a supplementary guide 22, which consists of two vertical parallel portions $22^a$, having at their upper ends an eye 22$^b$, through which the weft-thread is inserted, said weft-thread having its end depending between the vertical portions 22$^a$. The take-up wheel 21 is mounted loosely upon a transverse shaft 23 and is provided on its side with a ratchet-wheel 21$^a$, which is engaged by a pawl 24$^a$ on the band-wheel 24. This construction permits the take-up wheel 21 to revolve freely in the direction in which the binding weft-thread is paid off.

Secured on the end of the shaft is a band-wheel 24, around which a band or cord 25, connected thereto at one end, passes. This cord 25 is secured at its lower end to a lever 26, operated from a cam 26$^a$ on the cam-shaft 6$^a$. This lever is caused to reciprocate vertically and revolve the wheel 24 to pay off the binding weft-thread. Secured to the shaft 23 at one end and to a portion of the take-up frame at the other is a coil-spring 27, the object of which is to rotate the wheel 24 in the opposite direction to that in which it is moved by the band 25, thereby winding the said band or cord 25 upon the band-wheel 24 as the lever 26 is elevated and simultaneously drawing the loop in the binding weft-thread up to the marginal warp-threads. From the above it will be seen that when the thread-carrier B seizes the binding weft-thread $y'$ and moves across the warp to the opposite side the take-up wheel revolves freely and pays off the binding weft-thread, the lever 26 being depressed by the cam 26$^a$. After the thread-carrier B reaches its opposite terminal of movement and the reciprocating selvage-shuttle D has fed the shuttle-thread $z$ through the loop of the binding weft-thread the movement of the take-up wheel 21 is reversed, the lever 26 being raised through the band 25, band-wheel 24, and shaft 23, and the loop drawn up to the marginal warp-threads on the opposite side of the warp.

In order to impart a reciprocating movement to the selvage-shuttle D, I employ a gear-wheel 30, secured upon a shaft 31. This gear-wheel engages with the teeth 32 upon an arm D$^3$ of the shuttle-holder D$^2$, which carries the shuttle D and is designed to throw it outward or inward, according to the direction of its movement. On the outer end of the shaft 31 a band-wheel 33 is secured, around which a band or cord 34 passes and is secured thereto. This band is secured at its lower end to a vertically-reciprocating lever 35, pivoted to the frame A of the loom and operated through a cam 36 on the cam-shaft 6$^a$.

37 is a coil-spring encircling the shaft 31, to which it is secured at one end and at its opposite end to the band-wheel 33. This spring is designed to wind the band or cord 34 upon the wheel 33 as the lever 35 is elevated. The end of the shuttle-arm D$^3$ is flared and recessed to form a holder D$^2$ for the reception of the shuttle D, a space 39 being left between the holder D$^2$ and the shuttle D for the passage around the shuttle D of the loop of the binding weft-thread $y'$.

From the above it will be seen that when the binding weft-thread has been drawn across the warp from the opposite side in the form of a loop the selvage-shuttle engages the loop and feeds it upon the shuttle-thread $z$. The selvage-shuttle is then withdrawn from the loop, and the loop is drawn up to the edge of the warp by the weft-slack take-up mechanism described above to form a selvage for the fabric.

As has hereinbefore been stated, the chenille filling-thread is severed adjacent to the edge of the warp on the side thereof from which it is fed. Various means for effecting this will suggest themselves to mechanics; but I have found those which I will now describe most effective. The thread-cutter C is composed of two cutting-blades 40, pivoted together. One of these blades is fixed stationary to the frame of the loom, while the other is attached by means of a link 41 to an arm 42 on one end of a shaft 43. This shaft 43 carries on its opposite end a similar arm 45, which in turn is connected by a link 46 to a lever 50, pivoted to the side of the loom.

Formed on the under side of the lever 50 is a lug or enlargement 54. This lug is designed to be engaged by a friction-roll 55 on the sword E$^2$ of the lathe E during the forward movement of the latter to lift the lever 50. It will be seen from this description that at every upward movement of the lever 50, in consequence of the action of the friction-roll 55 thereon, the blades of the cutter C will be forced together and the chenille filling-thread severed every time it is drawn across the warp.

The means for opening and closing the gripper-jaws of the thread-carrier B as it reaches each terminal of its movement forms a part of the subject-matter of a copending application filed by me on September 16, 1893, Serial No. 485,717, and it is not deemed necessary to herein describe the devices in detail.

It is necessary that the thread-carrier B be allowed a sufficient period to rest at each terminal of its movement in which to seize the proper thread. I have provided for this by arranging on the conducting-wires $w$, (see Fig. 2,) which supply the current to the motor E$^3$, a switch $v$. This switch may be of any suitable construction, but as shown comprises a centrally-pivoted contact-bar $v^2$, which is normally held in contact with a contact-piece $v^3$ by a spring $v^4$. The contact-bar $v^2$ is moved out of engagement with the contact-piece by means of a lever 61, pivoted upon the switch $v$ and provided with a cam-face which bears upon the lower end of the lever. This lever 61 is connected by means of a link 60 to the sword of the lathe in such manner that at every forward movement of the lathe, which takes place only when the thread-carrier has reached one of the terminals of its movements, the electric current to the motor E will be cut off by reason of the contact-bar being moved by the link 60 and lever 61 out of engagement with the contact-piece. Instantly the motor-current is shut off the motor and the mechanism intermediate it and the thread-carrier is brought to a dead stop and not again allowed to start until the lathe has been moved back to its rear position.

During the passage of the chenille filling-thread $y$ through the warp-threads $x$, and in the process of beating them up by the reed, the colors or points forming the pile of the fabric are liable to become entangled and pressed out of shape. In order to overcome this, I have devised means for brushing up the pile of the fabric, which I will now describe and which is shown clearly in Figs. 5 and 6 of the drawings.

Pivoted near their upper ends to brackets 70 of the frame A are two parallel arms 71, extending downward therefrom to a point adjacent to the surface of the woven fabric. Journaled in the lower ends of these arms are transverse shafts 72, upon which the parallel brushes 73 are secured. These shafts are connected by means of gears 74, secured thereon, and are designed to rotate in opposite directions. By the arrangement of two parallel and oppositely-revolving brushes the pile of the fabric is brushed up vertically and passes from beneath the brushes to a take-up drum in this condition upon the elevation of said brushes from the fabric, the means for accomplishing the raising of the brushes from contact with the fabric being described below. Near one end of these shafts 72 a sprocket-wheel 75 is secured, which is connected by means of a chain 76 to a similar wheel 77 of a shaft 78, journaled in the bracket 70. Power is supplied to this shaft 78 from the power-shaft $5^a$ through a chain 79 and a sprocket-wheel 80, secured on the end of the shaft 78. Secured upon the shaft 78 are cams 81, which are engaged by pins from the upper ends of the arm 71. These cams are so arranged that the lower ends of the arms, and consequently the brushes 73 secured thereon, will be lifted from contact with the fabric at each movement of the thread-carrier B across the warp and will remain elevated during the winding of the fabric upon the take-up drum. When the thread-carrier reaches each terminal of its movement, they will again be lowered into contact with the fabric and thus brush up the pile of the fabric which has just been brought beneath them, giving it a finished appearance before it leaves the loom, instead of finishing it by a separate process, as is ordinarily done.

The advantages of the several parts of my improvement will be appreciated by those skilled in the art to which it appertains; and within the scope of my invention as defined in the following claims modifications may be made in the form, construction, and position of the parts and some features of my invention used without others, since

What I claim is—

1. In a loom, the combination of a thread-carrier, means for reciprocating it across the warp and mechanism for automatically and positively feeding the thread as the thread-carrier travels across the warp, substantially as described.

2. In a loom, the combination of a thread-carrier, means for reciprocating it across the warp and mechanism for automatically and positively feeding the thread at the same rate of speed as that at which it is carried by the thread-carrier, substantially as described.

3. In a loom, the combination of a thread-carrier, means for reciprocating it across the warp, mechanism for automatically and positively feeding the thread as the thread-carrier travels across the warp and a cutting device arranged on one side of the warp adjacent to the feeding mechanism, substantially as described.

4. In a loom, the combination of a thread-carrier, and its reciprocating mechanism, an electric motor for driving said reciprocating mechanism and devices for automatically throwing said motor into and out of operation at a predetermined time, substantially as described.

5. In a loom, the combination of a thread-carrier and its reciprocating mechanism, an electric motor for driving said mechanism and devices for throwing said motor out of operation as the thread-carrier reaches the terminal of its movement and for throwing it into operation to move the thread-carrier across the warp, substantially as described.

6. In a loom, the combination of a lathe, means for imparting an oscillating movement thereto, a thread-carrier supported on the lathe, mechanism for reciprocating the thread-carrier across the lathe, a motor for driving the reciprocating mechanism of the thread-carrier and devices for throwing the motor out of operation at each forward movement of the lathe and for throwing it into operation when the lathe returns to its normal position, substantially as described.

7. In a loom, the combination of a lathe, means for imparting an oscillating movement thereto, a thread-carrier carried upon the lathe, an electric motor also carried upon the lathe and devices intermediate of the thread-carrier and motor operated by the latter for reciprocating the thread-carrier, substantially as described.

8. In a loom, the combination of a thread-carrier, means for reciprocating it across the warp-threads, a take-up wheel at one side of the warp-threads, means for rotating the take-up wheel in one direction to pay off the weft-thread as the thread-carrier travels across the warp-threads to the opposite side thereof, and for rotating it in the opposite direction to draw the end of the thread released by the thread-carrier to the edge of the warps, substantially as described.

9. In a loom, the combination of a thread-carrier, means for reciprocating it across the warp-threads, a selvage-shuttle arranged at one side of the warp-threads for feeding a shuttle-thread through a loop in the weft-thread, a take-up wheel at the opposite side of the warp, means for rotating the take-up wheel in one direction to pay off the weft-thread as the thread-carrier travels across the warp-threads and for rotating it in the opposite direction to draw the loop of the weft-thread to the edge of the warp after the shuttle-thread has been fed therethrough, substantially as described.

10. In a loom, the combination with a thread-carrier, and means for reciprocating it across the warp-threads, of suitable feeding devices at one side of the warp-threads adapted to feed a filling-strip to the thread-carrier, a selvage-shuttle and cutting device, arranged intermediate the feeding devices and the edge of the warp, and feeding and take-up mechanism arranged at the opposite side of the warp, substantially as described.

In testimony whereof I have signed my name to this specification in the presence of two subscribing witnesses.

WILLIAM WEAVER.

Witnesses:
PAUL W. STEVENS,
ELBERT O. HULL.